(12) United States Patent
Josephs

(10) Patent No.: US 9,025,085 B2
(45) Date of Patent: *May 5, 2015

(54) METHODS AND APPARATUS FOR PROVIDING ACCESS TO PROGRAM CHANNELS

(71) Applicant: Time Warner Cable Enterprises LLC, New York, NY (US)

(72) Inventor: Hugh Josephs, Boulder, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,203

(22) Filed: Jul. 14, 2014

(65) Prior Publication Data

US 2014/0366060 A1    Dec. 11, 2014

Related U.S. Application Data

(63) Continuation of application No. 12/609,697, filed on Oct. 30, 2009, now Pat. No. 8,780,276.

(51) Int. Cl.
*H04N 5/50* (2006.01)
*H04N 21/482* (2011.01)
*H04N 21/2343* (2011.01)
*H04N 21/438* (2011.01)
*H04N 21/462* (2011.01)

(52) U.S. Cl.
CPC ....... *H04N 21/482* (2013.01); *H04N 21/23439* (2013.01); *H04N 21/4383* (2013.01); *H04N 21/462* (2013.01)

(58) Field of Classification Search
USPC ......... 348/731, 725, 726, 727, 728, 729, 730, 348/732, 733, 734, 569, 563, 555, 570, 348/558; 725/38, 47, 48, 49, 56, 57, 58, 59; 341/731

See application file for complete search history.

(56) References Cited

U.S. PATENT DOCUMENTS

| | | | | |
|---|---|---|---|---|
| 5,461,427 A * | 10/1995 | Duffield et al. | ............... | 348/555 |
| 5,900,915 A * | 5/1999 | Morrison | ......................... | 725/44 |
| 6,359,580 B1 * | 3/2002 | Morrison | ......................... | 348/731 |
| 7,050,117 B2 * | 5/2006 | Takagi et al. | .................. | 348/725 |
| 7,061,542 B1 * | 6/2006 | Ikeguchi | ....................... | 348/558 |
| 7,265,797 B2 * | 9/2007 | Bae | ............................... | 348/732 |
| 7,546,623 B2 * | 6/2009 | Ramraz et al. | .................. | 725/48 |
| 2005/0010947 A1 * | 1/2005 | Ellis | ................................. | 725/38 |

(Continued)

*Primary Examiner* — Jefferey Harold
*Assistant Examiner* — Mustafizur Rahman
(74) *Attorney, Agent, or Firm* — Straub & Pokotylo; Michael P. Straub; Stephen T. Straub

(57) ABSTRACT

Methods and apparatus for providing access to program channels, e.g., high definition programs and program channels which corresponding to a standard definition program and/or program channels are described. In accordance with the invention, a high definition auto tune function is supported. When enabled, in one exemplary embodiment, if a user selects a standard program definition channel, a check is automatically made to determine if a corresponding high definition program channel is available. The corresponding high definition program channel is a channel which provides the same program as on the selected standard definition channel but in high definition. When the auto tune function is enabled and a corresponding high definition channel is available, the device, e.g., set to box or tuner implementing the auto tune feature of the present invention, automatically tunes to the high definition channel instead of the standard definition channel.

19 Claims, 10 Drawing Sheets

(56) References Cited

U.S. PATENT DOCUMENTS

| | | | |
|---|---|---|---|
| 2006/0271952 A1* | 11/2006 | Gurley et al. | 725/33 |
| 2007/0101370 A1* | 5/2007 | Calderwood | 725/47 |
| 2007/0288958 A1* | 12/2007 | Knudson et al. | 725/39 |
| 2008/0141317 A1* | 6/2008 | Radloff et al. | 725/87 |

* cited by examiner

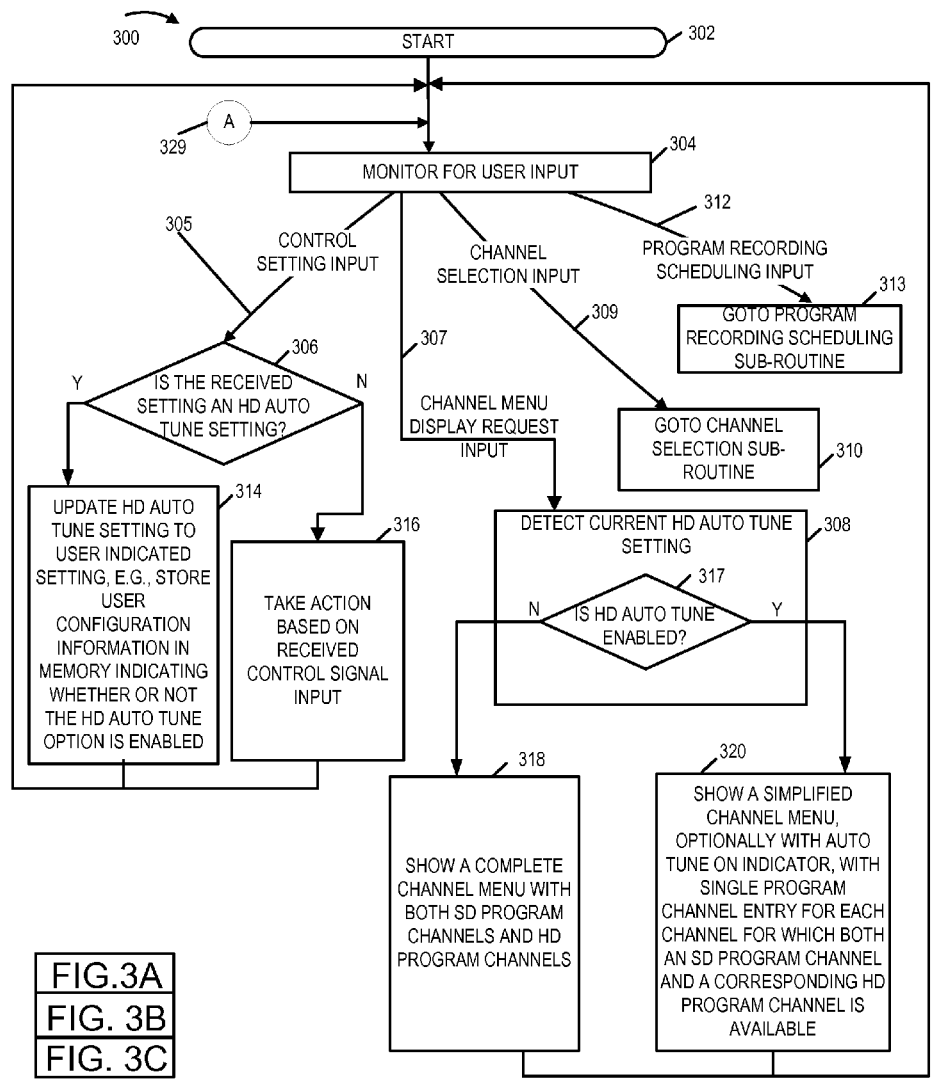

| | BROADCASTER ID | CHANNEL NUMBER | CHANNEL NAME | CORRESPONDING QAM FREQUENCY |
|---|---|---|---|---|
| 812 → | XXX | 3 | FOX | F1 |
| 814 → | XYX | 5 | MSNBC | F2 |
| 816 → | XYZ | 8 | ABC | F3 |
| 818 → | XAX | 490 | HISTORY | F4 |
| 820 → | YXY | 520 | DISCOVERY | F5 |

FIG. 8

METHODS AND APPARATUS FOR PROVIDING ACCESS TO PROGRAM CHANNELS

RELATED APPLICATIONS

The present application is a continuation of U.S. patent application Ser. No. 12/609,697 filed Oct. 30, 2009 which is hereby expressly incorporated by reference in its entirety.

FIELD OF THE INVENTION

The invention relates to methods and apparatus for providing access to programs, e.g., High Definition and/or Standard Definition television programs.

BACKGROUND OF THE INVENTION

High Definition (HD) television is growing in popularity. As a result, cable and other communications services, e.g., satellite television service providers, are currently in the process of adding ever increasing amounts of High Definition (HD) programming content. However, there remains a great deal of deployed equipment, e.g., set top boxes and televisions, which are not capable of supporting HD television. In addition, there remains a large amount of existing content which is in Standard Definition (SD) format.

In order to support existing SD systems it seems likely that SD content will continue to be broadcast for sometime. However, in order to attract and retain customers seeking higher quality content, e.g., television programs, sports programs and other video in HD resolution, broadcasters including many cable and satellite broadcasters, are now offering HD quality content as a premium service while continuing to offer the same content, e.g., programs, at SD resolution. Unfortunately, the number of HD channels remains relatively small compared to the number of SD channels. While this may change with time, given the higher bandwidth required for HD channels, it seems likely that for sometime, more channels will continue to be offered in SD rather than HD. Furthermore, given the large amount of deployed hardware that supports only SD quality programs, it seems likely that programs available in HD format will continue to be simulcast in SD for quite sometime.

Many customers have grown accustomed to the SD program channel lineup available by a particular service provider. To maintain the availability of SD programs, HD programs which are simulcast are normally provided on a different, e.g., higher channel number, than the SD version of the corresponding program. Often, there is no fixed relationship between the program channel of an SD version of a program and the corresponding HD version of the program. This can make it difficult for a user to locate a HD channel corresponding to an SD channel or even determine if an HD version of a program being presented is available on another channel.

While presenting both the SD program and HD program one after the other in a program guide, regardless of the channel number of the HD program is one approach to helping users discover an HD program or program channel corresponding to an SD program, it has the disadvantage of reducing the number of unique program listings, assuming HD and SD listings for the same program are not considered unique, that may be displayed on a single screen at a given time. Furthermore the display of both the HD and SD program information which is often redundant, e.g., the program title for both the HD and SD versions will normally be the same, can be distracting and make it more difficult for a user to find a program and/or information of interest when viewing a guide.

While the simulcast of HD and SD programs presents various guide issues, it provides greater flexibility in terms of program recording options which can be of interest given the increasing use of digital video recording devices (DVRs) whether they be network or customer premise based video recorders.

While HD programs offer superior image quality to SD, one drawback is that HD programs are represented using far more data, e.g., sometimes 4 times as much data, as is used for SD programs. As a result, when recorded, HD programs can quickly fill up the storage capacity of many digital video records (DVRs). For this reason, many customers while desiring to record some programs, e.g., movies and/or sporting events, in HD resolution, may desire to record other programs, e.g., news shows, at standard definition resolution even though the program is available in HD format. Accordingly, in many cases it remains desirable that a user be aware of the availability of both HD and SD versions of a program, particularly in the case of devices which support recording of programs for later playback.

In view of the above, it should be appreciated that while the increasing availability of programs in both HD and SD format provides users, e.g., content subscribers such as cable and satellite customers, ever greater options for viewing and/or recording content, it also raises the need for improved methods of presenting guide information and/or recording options to users.

SUMMARY OF THE INVENTION

Methods and apparatus for providing access to program channels, e.g., high definition programs and program channels which corresponding to a standard definition program and/or program channels are described.

In accordance with the invention, a high definition auto tune function is supported. When enabled, in one exemplary embodiment, if a user selects a standard program definition channel, a check is automatically made to determine if a corresponding high definition program channel is available. The corresponding high definition program channel is a channel which provides the same program as on the selected standard definition channel but in high definition. When the auto tune function is enabled and a corresponding high definition channel is available, the device, e.g., set top box or tuner implementing the auto tune feature of the present invention, automatically tunes to the high definition channel instead of the standard definition channel. The content from the high definition channel is then displayed instead of the content from the user selected standard definition channel.

In some embodiments while a high definition channel is being displayed in response to user selection of a standard definition channel, the channel number of the user selected standard definition channel is displayed, e.g., in a channel banner on a portion of the screen showing the high definition channel content, along with an indicator that the device is tuned to an HD channel, e.g., as a result of the HD auto tune function being enabled.

In some embodiments, while viewing an HD channel in response to a selection of an SD channel, for purposes of channel up or down commands, the current channel is treated as the number of the selected SD channel as opposed to the HD channel being viewed. Accordingly, for example, when a user is viewing the content of say, for example, HD channel 7000, in response to the user selection of SD channel 7, a channel up command will result in the next highest channel from the user selected channel number being displayed, e.g., channel 8. Similarly user selection of a channel down command will result in channel 6 (or the HD channel corresponding to SD channel 6 if HD auto tune is enabled) being displayed. Thus, for channel up/down purposes the user selected SD channel number controls while for display purposes, when auto tune is enabled, the HD channel assuming it is available will be displayed.

HD auto tune functionality may be set by a user in a variety of ways, e.g., through a control panel setting controlled by a user or by a user response to a prompt asking the user if the user would like to enable and/or disable the auto tune function. In one embodiment, after device (STB) power up, the first time a user selects an SD channel for which a HD program channel is available the user is prompted to indicate whether or not the user seeks to tune to the corresponding HD channel and/or whether the user would like to enable the HD auto tune feature so that tuning to an SD channel will in the future result in the corresponding HD channel being displayed and/or recorded.

In some embodiments the user controlled state, e.g., enabled or disabled, of the HD auto tune feature at the time of recording determines whether a recording of a selected SD program or program channel will be recoded in SD or if the corresponding HD program or program channel, assuming one is available, will be recorded. In other embodiments the user controlled state of the HD auto tune feature at the time a recording time is set, i.e., the time a user selects a program to be recorded, determines whether a recording of an SD selected program or program channel will be in SD or if the corresponding HD program or program channel, assuming one is available, will be recorded.

In some embodiments, when HD auto tune is enabled, a single program channel entry is displayed for program channels available in both SD and HD. In one such embodiment, SD channels and channel numbers are displayed in the guide. In some such embodiments an HD auto tune indicator is displayed in conjunction with the SD channel number and program information so that a user will be aware that selection of the SD channel will result in automatic tuning and display and/or recording of the corresponding HD channel. By displaying single channel entry for pairs of SD/HD program channels providing the same program content, the display guide is simplified as compared to implementations where both the SD and HD channels are displayed in the guide.

In some but not all embodiments, users are given the option to set the HD auto tune feature separately for different program categories. In such an embodiment, a user might select to set programs or program channels designated by guide information as corresponding to a first type of programming content to be recorded in SD while selecting, for example, programs or channels corresponding to a second type of programming content which is different from the first type to be recorded in HD using the HD auto tune feature when possible. For example, a user may designate news programs or channels to be recorded in SD with HD auto tune being disabled for news, while movies or sports are to be recorded in HD with HD auto tune being enabled for movies and sports programs. In this manner, a user can selectively control recording so that programs which a user may not be overly interested in having recorded in HD will be recorded in SD format while other programs the user may consider of greater visual importance will automatically be recorded in HD even if a user selects an SD channel assuming a corresponding HD channel exists. In this manner, a user can balance total available recording time with image quality in a manner that preserves HD image quality for those programs/channels a user considers to be most important.

The HD auto tune feature of the present invention allows an SD channel user to upgrade to HD programs and program channels without having to become familiar with the HD program channel numbers corresponding to the user's favorite SD channels and without the user having to keep track of which channels are available in HD format. Thus, migration to HD channels is simplified.

In order to support various HD auto tune features, in accordance with the invention STB's are provided with sufficient information, e.g., guide information and/or other information associating SD and HD program channels to enable a STB or other customer premise device to automatically determine the existence of a HD channel corresponding to a user selected SD program channel and to tune to the frequency band corresponding to the HD channel instead of the SD channel. Such information may be communicated as part of program guide information communicated to the customer premise devices and/or as part of information relating program channels to frequency bands and/or content, e.g., program, providers. The information may be communicated in one or more related sets of information used to display program information and/or tune to user selected program.

Various additional features and advantages of the present invention are discussed in the detailed description which follows.

BRIEF DESCRIPTION OF THE DRAWINGS

FIG. 8 illustrates an exemplary look-up table.

DETAILED DESCRIPTION

Figure 1:
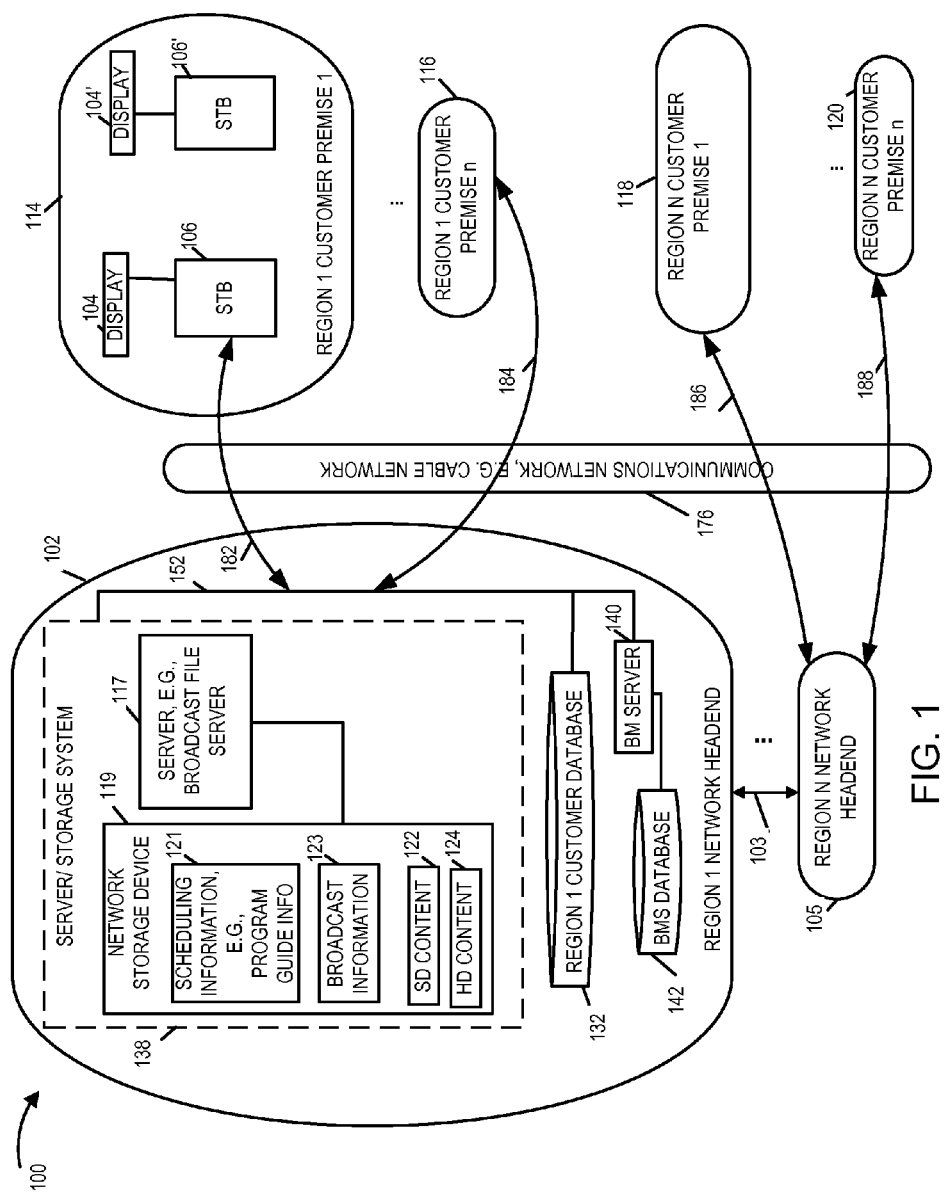
FIG. 1 illustrates an exemplary communications network implemented in accordance with the present invention.

FIG. 1 illustrates an exemplary content delivery and distribution system 100 implemented in accordance with the invention. The system 100 supports the provisioning of content delivery services, as well as user content selection, notification of content availability, communication of content to a user device, and billing for content provided to customers in accordance with various embodiments of the present invention. Exemplary system 100 includes a plurality of N regional service provider systems in the form of head end systems 102, 105. The N regional service provider systems include the first network head end system 102 corresponding to a first region, i.e., Region 1 and a region N service provider system in the form of headend system 105. Each regional service provider system, e.g., region 1 service provider system 102, region N service provider system 105, provides services, e.g., content delivery services, via communications network 176, to a corresponding set of customer premises 114, 115, 118 which correspond to the region serviced by the particular headed system. For example, region 1 network headend 102 provides services to the n customer premises 114, 116 corresponding to Region 1 while Region N network headend provides services to region N customer premise locations 1 through n 118, 120. As should be appreciated the number of customer premises n and m, respectively, will vary depending on the particular region and the number of customer locations in the individual region.

Each customer premise in a region may include one or more set top boxes in combination with a display device and/or one or more other types of content playback devices. For example, Region 1 customer premise 1 114 includes a first set of equipment, e.g. user 1 set top box (STB) 106 in combination with display 104. STB 106 is shown coupled to display 104, which may and in some embodiments is, a television set to which the STB 106 is coupled. However, it should be appreciated that the STB 106 can be integrated in a device which also includes the display 104. The STB 106 may, and often does, include Digital Video Recorder (DVR) functionality and storage for storing user selected content including SD (standard definition) content and, in some embodiments, HD (High definition) content. Region 1 customer premise 1 114 also includes additional STBs and displays, e.g. STB 106' and display 104' which are also coupled to the region 1 network headend via the communications network 176.

Region 1 network head end 102 includes a Server/storage system 138, a region 1 customer database 132, and a business management (BM) server 140 which in turn is coupled to a BMS (business management system) database 142. The customer database 132 is used to store customer account information, e.g., customer name, address, STB identification information, STB capability information, and information about customer subscribed services. The business management server database 142 coupled to business management (BM) server 140 includes customer billing information. As should be appreciated the BMS database 142 may be, and in some embodiments is, integrated with the customer database 132.

The server/storage system 138 includes the content server 117, e.g., a broadcast file server (BFS) 117 and/or an on-demand content server, coupled to a network storage device 119. Network storage device 119 stored content, e.g., SD content 122 and HD content 124 which may be delivered either as part of a content broadcast by server 117 or in response to an on-demand request for content received via network 176 from one or more customer premises 114, 116. As should be appreciated, a single server 117 is shown providing both broadcast and on-demand content but in many systems and embodiments this is done through the use of two servers each of which may have access to network storage device 119.

The various servers 138, 140 present in the network headend 102 are coupled together via a bus 152 over which they may interchange data and information and which can be used to supply content to the communications network 176 for delivery to various customer premise devices 106, 106'.

As shown in FIG. 1, region 1 customer premise 1 114 is coupled to region 1 network head end 102 via communications network 176 which can, and in some embodiments is, implemented as a cable network. Communications link 182 traversing the service provider's cable network 176 couples set top box 106 to the region 1 network head end's bus 152. Similarly, region 1 customer premise n 116 is coupled to region 1 network head end bus 152 via link 184 which traverses service provider cable network 176.

Region N customer premise 1 118 is coupled to region N network head end 105 via a communications link 186. Similarly, region N customer premise n 120 is coupled to region N network head end 105 via a communications link 188. The network head ends 102, 105 of the different regions are coupled together, e.g., via link 103 which may be over a back haul fiber optic network used to connect headend offices 102, 105.

Network storage device 119 includes programs such as movies, content of regional favorites, content of seasonal favorites, etc which can the broadcast to the customer premise devices 106, 106'. The stored content includes SD content 122 and HD content 124. The delivery of video and/or other content may, and normally is through server 117, that may output the content as a QAM (Quadrature Amplitude Modulated) signal that can be delivered over the cable network 176 to one or more set top boxes. In some embodiments the server 117 provides video streams, e.g., broadcast streams, to the set top boxes 106, 106' and/or any other customer premise device. In addition to scheduled broadcast streams or sever 117 may output Video on Demand (VOD) content streams generated in response to a VOD content request. In some embodiments the server 117 may consult BMS 140 before proceeding with delivery of some program content, e.g., VOD content, to one or more set top boxes in order to confirm whether or not the set top boxes are authorized to receive the on demand content.

Network storage device 119 may also include scheduling information 121 and broadcast information 123. The scheduling information 121 provides channel guide information, such as that shown in FIG. 7 while the broadcast information 123 provides the information necessary to map a channel or program to a particular QAM frequency to which a STB may tune to receive the program. As will be discussed below, the scheduling, e.g., guide, information 121 and/or the broadcast information 123 may, and in some embodiments does, include information indicating relationships between HD and SD program channels broadcasting the same content as well as where they occur both in terms of channel numbers and QAM frequency. This information can be used to generating the displayed program guides such as the one shown in FIGS. 4 and 5 and for facilitating the recording or display of HD programs automatically when the HD auto-tune feature supported in various embodiments is enabled. The schedule information 121 and broadcast information 123 are shown as being stored in network storage device 119 but may, and in some embodiments is, stored in memory within the server 117 and periodically broadcast to the STBs 106, 106' via communications network 176.

Business management server 140 generates and processes billing information corresponding to region 1 customers, e.g., updating billing charge information in response to upgrades, video on demand purchases, and/or other activity. Business management server 140 also processes bill payment information, e.g., credit card transactions, deductions from debit accounts, mail bills, and/or processes discount and/or coupon information.

Figure 2:
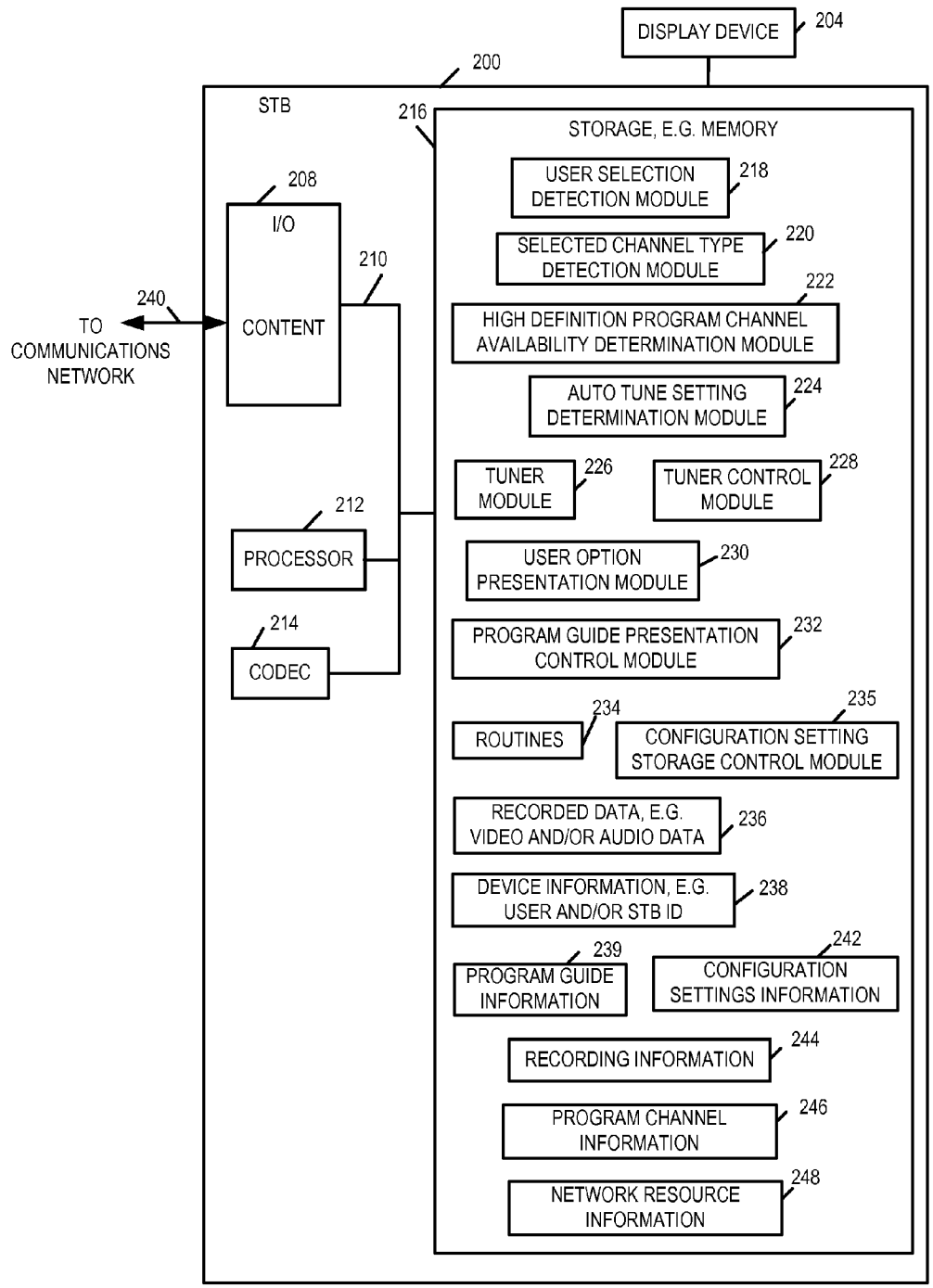
FIG. 2 illustrates an exemplary set top box which may be used in the exemplary communications network of FIG. 1.

FIG. 2 illustrates an exemplary set top box (STB) 200 implemented in accordance with one exemplary embodiment. The exemplary STB 200 may be used as any one of the STBs 106, 106' of the system shown in FIG. 1. As shown, the STB 200 is coupled to a display device 204, e.g. a monitor and/or a Television (TV). The STB 206 includes an Input/Output (I/O) interface 208, a processor 212, a codec (Coder/Decoder) module 214, and a storage device, e.g. a memory 216 coupled together via a bus 210. The various elements of the STB 200 can exchange data and information over the bus 210. Via the I/O interface 208, the STB 200 can exchange signals and/or information with other devices and/or system elements such as the server/storage system 138 in the network head end 102 of region 1, via the communications network 176. The I/O interface 208 supports the receipt and/or transmission of content from/to different servers, e.g., the BFS server 117, as represented by arrow 240. The I/O interface 208 in some embodiments may also include, e.g., an infrared signal receiver to receive signals from a user remote control device.

The processor 212, e.g., a CPU, executes routines 224 stored in the memory 216 and, under direction of the routines 234, controls the STB 200 to operate in accordance with the invention. The processor 212 is responsible for general operation of the set top box 200 including, e.g., presentation of information and/or programs for display. To control the STB 200, the processor 212 uses information and/or routines including instructions stored in memory 216. The Codec 214 is implemented as a module and is capable of performing encoding and/or decoding operations on a digital data stream or signal.

The memory 216 includes a user selection detection module 218, a selected channel type detection module 220, a high definition program channel availability determination module 222, an auto tune setting determination module 224, a tuner module 226, a tuner control module 228, a user option presentation module 230, a channel guide presentation control module 232, a configuration setting storage control module 235, various routines 234, recorded data 236, user device information 238, program guide information 239, user configuration settings information 242, recording information 244, program channel information 246 and network resource information 248. Routines 234 include communications routines and/or set top box control routines.

User selection detection module 218 detects a user selection or input, e.g., from a control device such as a remote control. Signals from the remote control may be received via I/O module 208 which may include, in addition to a cable network interface, an IR or radio interface for receiving signals from a remote control device. The selection detection module 218 determines, on receipt of a signal, e.g., control signal, providing user input, as to what type of selection has been made by the user, e.g., a channel selection, a program guide selection, a recording related selection, an on-demand service selection, a selection to show control menu setting, etc.

Selected channel type detection module 220 detects which channel and what type of channel, e.g., SD/HD, has been selected when the set top box 200 receives a channel selection signal from the user. For example when a user selects a channel number corresponding to a standard definition program channel the selected channel type detection module 220 detects that a standard definition program channel has been selected by the user. The high definition program channel availability determination module 222 is configured to determine if a high definition program channel is available corresponding to a selected standard definition program channel.

In some embodiments the determination module 222 makes such a determination by consulting the program channel information stored in the STB 200.

Auto tune setting determination module 224 is responsible for determining whether a high definition auto tune option has been selected or enabled by the user. This determination may be based on input stored in configuration setting information 242 or from user supplied input. The tuner module 226 is configured to tune to a frequency corresponding to a program channel to be viewed or recorded. This may be a user selected channel or, if HD auto tune is enabled, an HD channel corresponding to a selected SD channel. The tuner module 226 may consult the program channel information 246 to determine the frequency corresponding to the user selected channel so that the tuner can tune to the correct frequency. The tuner control module 228 controls the tuner module 226 to tune to a frequency corresponding to a high definition program channel corresponding to a user selected SD channel when the auto tune feature is enabled and to tune to the frequency of the user selected channel (HD or SD) when the auto tune feature is not enabled. Thus, in some embodiments the tuner control module 228 is configured to control the tuner module 226 to automatically tune to the frequency corresponding to the high definition program channel when it is determined that a high definition program channel is available corresponding to the selected standard definition program channel and the high definition auto tune option is enabled.

In various embodiments the determination as to whether a high definition auto tune option has been enabled is made prior to tuning to a frequency corresponding to a user selected program channel so that an appropriate decision can be made by the tuner control module 226 regarding which frequency to tune to and to avoid the need to switch from an SD channel to the HD channel after tuning.

The user option presentation module 230 supports the interaction between the user of the STB 200 and the network head end 102 through the STB 200. The user option presentation module 230, in some embodiments, controls presentation of, following detecting selection of a standard definition program channel for which a high definition program channel exists, a prompt to the user of the STB 200, providing the user an opportunity to select the corresponding high definition program channel. In some embodiments the user option presentation module 230 is configured to present a prompt to the user of the STB 200, following detecting that the user has selected the corresponding high definition program channel, providing the user an opportunity to select a high definition auto tune option to be used automatically.

Program guide presentation control module 232 is for controlling presentation of a channel menu including standard definition channels along with an indicator that the high definition auto tune function has been enabled when the high definition auto tune function is enabled. In some embodiments the indicator indicating that the high definition auto tune function has been enabled is presented with each standard definition program channel indicator which corresponds to a program channel for which a corresponding high definition program channel is available. In some embodiments the program guide presentation control module 232 presents the user a list of program channels, the list including a single program channel entry for each program channel for which both a standard definition and a corresponding high definition program channels are available. Thus, the program guide presentation control module 232 in some embodiments presents a simplified channel menu showing a single entry for the program channels for which both standard definition and high definition program content is available.

The configuration setting storage control module 235 controls storage, in the memory 216, of information indicating that the high definition auto tune option has been enabled upon detecting that the user has selected the high definition auto tune option or disabled in response to user input indicating that the auto tune function is not selected or is to be turned off. Such information is stored in the memory as configuration settings information 242 and may be updated by the storage control module 235 upon detecting a change in the settings of the high definition auto tune option by the user. The configuration setting information 242 may include a single auto tune enable/disable setting information for the device 200 or it may include enable/disable auto tune information on a per program type basis. For example, HD auto tune may, and in some embodiments is, enabled for movies but not for news or cartoon broadcasts. In such an embodiment the type of program to be viewed in combination with the per program HD auto tune setting information is used to determine if the STB is to tune to a corresponding HD channel instead of a selected SD channel when a corresponding HD broadcast is available.

Recorded data 236, e.g. video and/or audio data, can be movies, songs, shows, etc. that the user may have download and/or otherwise stored on his set top box. The recorded data may include both HD and SD content. It should be appreciated that in some embodiments the high definition content may be stored separately from the standard definition content, within the recorded data 236, in the memory. The device information 238 may include, e.g. a user ID corresponding to a user of the device, Media Access Control (MAC) address of the STB, etc. and or other information stored in the set top box memory which can be used to identify the device 200 and/or control device operation or settings. In various embodiments, the MAC address is used for routing content and/or control signals to/from the STB 200. Thus, in at least some embodiments, the MAC address is used by the service provider to uniquely identify different set top boxes belonging to different users, and direct broadcast content to these STB's.

The program guide information 239, in some embodiments includes, e.g., channel name and number, program title/name, scheduled program presentation time etc. The program guide information 239 may also include program rating information and program content information which is normally displayed upon a request from the user, e.g., after receiving a information request signal from the user requesting more information on a program. Rating information and program content information may, and normally is, not displayed when the guide is presented in a grid format but may be displayed in response to a user selecting an information button on a control device or selecting a detailed program guide display format.

Configuration settings information 242 includes information regarding control settings, e.g., which have been set by the user. The configuration settings information 242 includes information indicating whether or not the high definition auto tune option has been enabled. The configuration settings information 242 is updated, e.g., by the configuration setting storage control module 235, when one or more settings are changed, e.g., by a STB user via a control device such as a remote control. The configuration settings information 242 may, and sometimes is used by the set top box 200 in making decisions about the information and/or program content to be displayed. For example, if a user has enabled an HD auto tune function in accordance the invention, e.g., by selecting HD auto tune option from STB control settings, then in at least one embodiment, for program channels for which a corresponding HD program channel is available, the corresponding HD channel is displayed when the user selects the SD channel for display.

Recording information 244 includes a set of information regarding the user scheduled recordings as well as past program recordings by the user. The recording information 244 in some embodiments includes, e.g., channel name and/or number on which a program to be recorded is broadcast, program start time and end time, program identification information, e.g., a program ID. In some embodiments the recording information 244 also includes program type information which gives an idea about the type of program to be recorded, e.g., a movie, news, sports, animations etc. The STB 200 may use the recording information 244 in making decisions about scheduled program recordings.

Program channel information 246 includes program identification information such as program ID corresponding to a program, information regarding the communications channels over which program content is broadcast, e.g., QAM frequencies, channel numbers as normally configured by the service provider/cable operator, information indicating if a program is a standard definition or high definition program, information indicating channel networks, information indicating whether or not a high definition program channel corresponding to a standard definition program channel is available and the corresponding frequency band used to communicate the high definition program channel when a corresponding high definition program channel is available. Network resource information 248 includes information regarding the network headend which is serving the user of STB 200 and regarding the services that are available to the user of the STB 200, i.e. number of channels, on-demand services etc. Based on the program channel information 246 and/or received program guide information, the STB 200 is able to determine if there is an HD channel corresponding to a selected SD channel which has the same program content as the SD channel and the frequency of the corresponding HD channel.

Figure 3B:
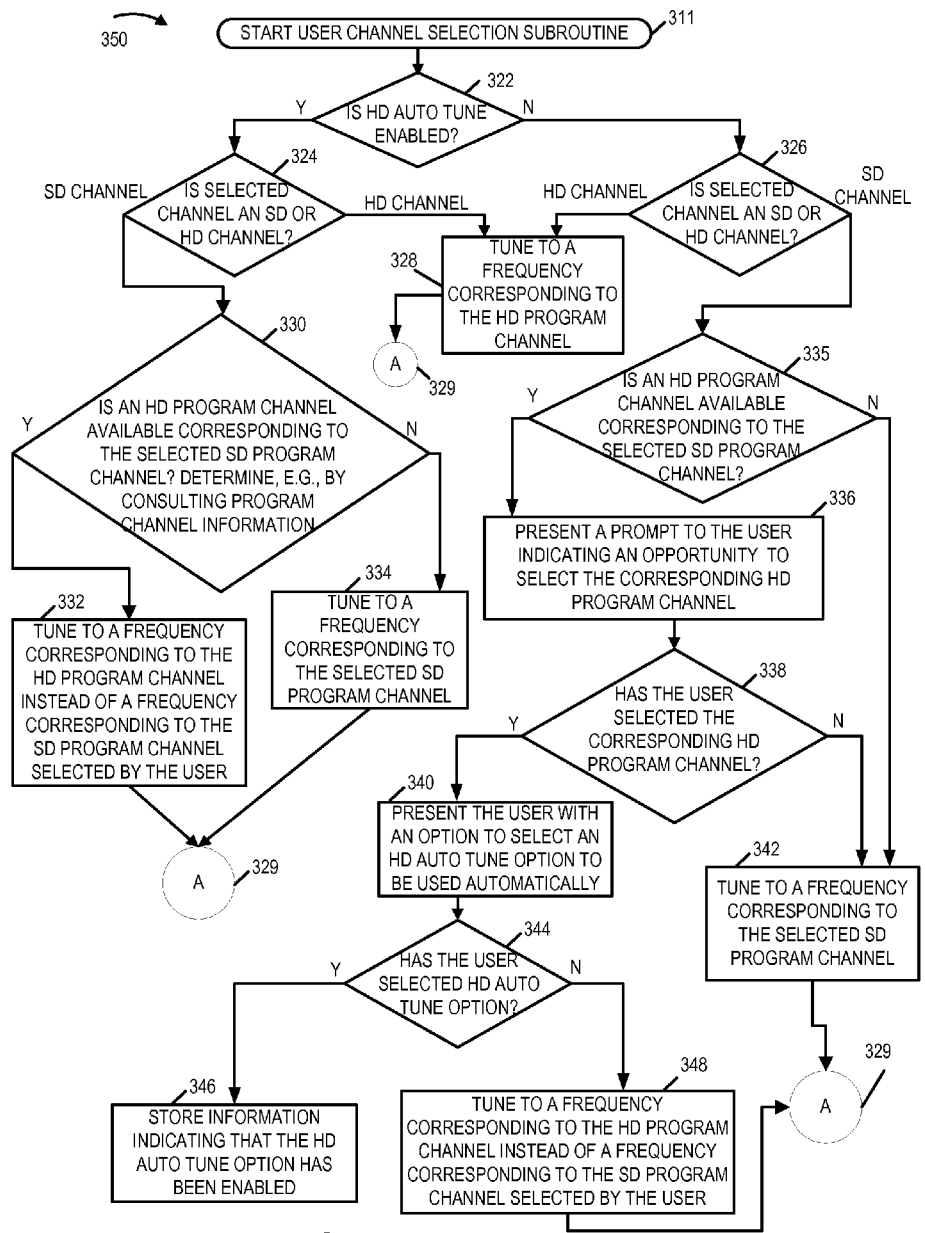
FIG. 3 which comprises the combination of FIGS. 3A, 3B and 3C, is a flowchart illustrating the steps of an exemplary method which can be performed by an exemplary set top box, in accordance with the invention.
Figure 3C:
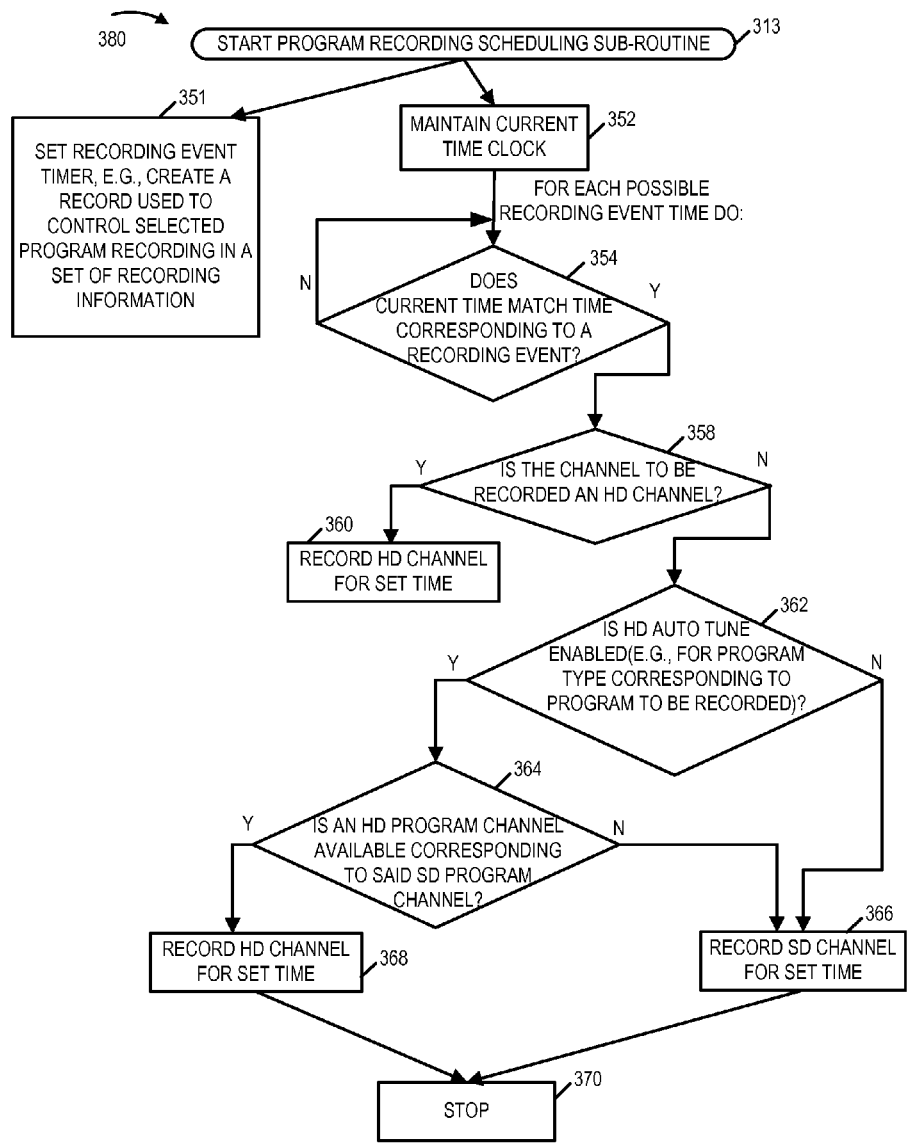

One particular exemplary embodiment will now be described with reference to FIG. 3. FIG. 3 which comprises the combination of FIGS. 3A, 3B and 3C is a flowchart 300 illustrating the steps of an exemplary method which can be performed by a set top box 200 of FIG. 2, in accordance with the invention. The exemplary method starts in step 302 where the STB 200 is powered on and initialized. Then in step 304 the STB 200 monitors for a user input, e.g., such as a signal from a user remote control device. The STB 200 may see one or more input signals from the user, e.g., at different times, and may accordingly respond in different ways, in accordance with the invention. As shown in FIG. 3A, in accordance with the invention, upon detecting different input signals, e.g., a control setting input, a channel menu display request, a user channel selection input, and a program recording scheduling input, the STB 200 performs different steps with the operation proceeding from step 304 as shown by arrows 305, 307, 309 and 312 respectively, depending on the type of received input signal detected in step 304.

Upon receiving a control setting input, e.g., a signal used to control a device setting, operation proceeds from step 304 to step 306. A control input setting input maybe, e.g., an input used modify a current user setting on the STB 200, e.g., a setting indicating that HD auto tune is to be enabled or disabled for instance. The control settings may include a plurality of options using which the user can configure STB 200 and, e.g., control what and how information and/or program content is displayed on a user display device, e.g., display 204. In accordance with one aspect of the invention, one of the control setting options available to the user is the HD auto tune function, which the user can enable or disable. In step 306 the STB 200 determines whether the received control setting input is input used to control the HD auto tune setting. As discussed above, in accordance with one aspect of the invention, the HD auto tune function when enabled controls the STB 200 to automatically tune to a high definition version of a selected channel if available, even when the selected channel number corresponds to a standard definition (SD) channel. If the received control setting input is the HD auto tune setting input, operation proceeds from step 306 to step 314 wherein the HD auto tune setting is updated to match the user indicated setting, e.g., the HD auto tune setting is set to enabled or disabled based on the user input. Updating of the HD auto tune setting information involves updating user configuration information 242, stored in the memory 216, to indicate whether or not the HD auto tune option is enabled or disabled as indicated by the received control signal. Operation proceeds from step 314 back to step 304 during which the STB monitors to detect additional input. In the event when the received control setting input is not the HD auto tune setting control input, operation proceeds from step 306 to step 316 where the STB 200 takes action based on the information in the received control setting input, e.g., executes a subroutine corresponding to the received setting information. Operation proceeds from step 316 back to monitoring step 304.

In step 304, in response to detecting channel menu display request input, operation proceeds from step 304 to step 308. The channel menu display request is, e.g., an input signal to the STB 200 requesting display of a channel menu, e.g., a program guide. The format of the guide, and displayed information, depends in some embodiments on whether or not the HD auto tune feature is enabled at the time of the menu display command is processed. In step 308, the STB 200 detects what the current setting of the HD auto tune option is by checking the control menu setting, i.e., check whether or not the HD auto tune option is enabled or disabled. Step 308 includes a decision step 317 in which a decision is made as to how the operation may proceed, based on the detected state of the HD auto tune setting. If it is detected that HD auto tune option is disabled, operation proceeds from step 317 to step 318 where a program guide with a complete channel menu portion showing separate entries for SD program channels and HD program channels, is displayed. Operation proceeds from step 318 back to monitoring step 304.

Figure 5:
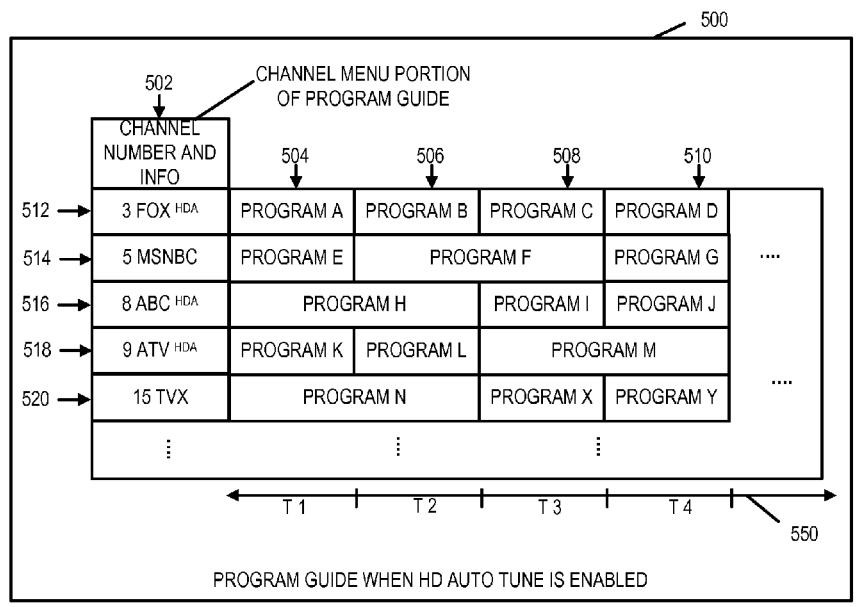
FIG. 5 illustrates an exemplary program guide that a user can access when the HD auto tune function is enabled, in accordance with one exemplary embodiment of the invention.

However, if is detected that HD auto tune option is enabled, the operation proceeds from step 317 to step 320 where the program guide showing a simplified channel menu portion, optionally with an HD auto tune ON indicator, and with a single program channel entry for each channel in the displayed list for which both an SD program channel and a corresponding HD program channel is available, is displayed. In accordance with the invention, by enabling HD auto tune option, the user directs the STB 200 to automatically tune to high definition version of the SD program channels for which a corresponding HD channel is available. In addition, the program channel menu may, and normally is, modified to avoid displaying both the SD and corresponding HD channel in a guide as might occur in other systems. Thus, for such program channels for which both an SD and HD version is available, there is no need to display separate program channel entries. However in some embodiments, an HD auto tune ON indicator which indicates that HD auto tune option is enabled is displayed, e.g., along with each single program channel indicator which corresponds to a program channel for which a corresponding HD program channel is available. Such an exemplary simplified program guide is shown in FIG. 5 and will be discussed later. Operation proceeds from step 320 back to monitoring step 304.

In step 304 if a channel input selection signal is detected, e.g., from a remote control operated by a user, operation proceeds to step 310 in which the STB 200 starts executing user channel selection subroutine 350 shown in FIG. 3B.

Channel selection subroutine 350 shown in FIG. 3 starts at step 311 when it is called from another routine, e.g., the main routine shown in FIG. 3A. The input to the channel selection subroutine is information or a signal identifying a channel selected by a user of the STB as might be indicated by the user entering a program channel number or selecting a highlighted channel displayed to the user as part of a program guide. Selection of a channel by the user may be expected to result in display of the television or other program being broadcast on the selected channel or, if an SD channel is selected and a corresponding HD channel exists, display of the corresponding HD program channel content when HD auto tune is enabled. Operation proceeds from start step 311 to step 322 in which a determination is made as to whether or not the HD auto tune option is enabled. If the HD auto tune option is determined to be enabled, e.g., based on the stored configuration setting indicating that it is enabled, operation proceeds to step 324. If however, the auto tune option is found to be disabled, the operation proceeds to step 326.

In step 324 it is determined whether the channel selected by the user is a standard definition channel or a high definition channel. The STB 200 can detect the selected channel type using selected channel type detection module 220. This can be detected, for example, using the selected channel number and stored information indicating whether the selected channel conveys SD or HD programming content. In some cases, SD channels correspond to a different channel number range than HD channels in which case, the STB can determine based on whether the selected channel falls in the SD channel number range or HD channel number range whether an SD or HD channel has been selected, e.g., for viewing. If the selected channel is an HD program channel, operation proceeds from step 324 to step 328 wherein the STB 200 tunes to a frequency corresponding to the selected HD program channel and the HD program channel is displayed to the user as is normally the case. Operation proceeds from step 328 back to step 304 via connecting node A 329.

If the selected channel is an SD program channel, what channel is displayed will depend on whether or not an HD channel corresponding to the selected SD program channel is available and also whether or not the HD auto tune feature is enabled. When the selected channel is an SD channel operation proceeds from step 324 to step 330. In step 330 a determination is made as to whether or not an HD program channel is available corresponding to the selected SD program channel. In some embodiments the STB 200 can determine this by consulting the program channel information 246. The program channel information 246 includes, at least in some embodiments, information that specifies if an HD channel is available corresponding to an SD channel, and if available the frequency and channel number of the corresponding HD channel. Operation proceeds from step 330 to step 332 when it is determined that an HD program channel is available corresponding to the selected SD program channel. In step 332, in accordance with the invention, the STB 200 tunes to the frequency corresponding to the corresponding HD program channel instead of the frequency corresponding to the user selected SD program channel. Thus in some embodiments, said tuning to the HD program channel is performed automatically in response to determining that a HD program channel is available corresponding to the selected SD channel and that the HD auto tune option has been enabled. Operation proceeds from step 332 back to step 304 via connecting node A 329.

If in step 330 it is determined that an HD program channel is not available corresponding to the selected SD program channel and thus automatic tuning to an HD channel corresponding to the selected SD channel is not possible, operation proceeds from step 330 to step 334 where the STB 200 tunes to the frequency corresponding to the selected SD program channel and the SD program channel is displayed to the user. Operation proceeds from step 334 back to step 304 via connecting node A 329.

The effect of the HD auto tune processing can be appreciated in the context of a simple example. Consider as an example a case where HD auto tune option has been enabled by a user, and the user selects an SD channel, e.g., channel 3. Further assume for the purpose of this example that a corresponding HD channel, e.g., channel 545, is available. In such an event, in accordance with the invention the STB 200 will tune automatically to channel 545 instead of channel 3 and the HD channel will be displayed to the user.

Now returning to step 326. In step 326 it is determined whether the selected channel is a standard definition channel or a high definition channel. If it is determined that the selected channel is an HD program channel, operation proceeds from step 326 to step 328 wherein the STB 200 tunes to the selected HD program channel and the HD program channel is displayed to the user. Operation proceeds from step 328 back to step 304 via connecting node A 329. If the selected channel is an SD program channel, operation proceeds from step 326 to step 335 wherein it is determined if an HD program channel is available corresponding to the selected SD program channel, e.g., by consulting the program channel information 246. In some embodiments determining whether or not an HD program channel is available corresponding to the selected SD program channel includes consulting the program channel information 246 indicating whether or not a high program channel is available corresponding to the standard definition program channel and the corresponding frequency band used to communicate the corresponding HD program channel when available. If an HD program channel corresponding to the selected SD channel is available, the operation proceeds from step 335 to step 336, otherwise the operation proceeds to step 342.

In accordance with the invention, following the determination that a corresponding HD program channel is available, in step 336 the STB 200 presents a prompt to the user, e.g., on the display screen, indicating an opportunity to select the corresponding HD program channel. Operation proceeds from step 336 to step 338 where the user's response to the presented prompt is detected and it is determined whether or not the user has selected the corresponding HD program channel for display. If the user does not select the corresponding HD program channel, the operation proceeds from step 338 to step 342. In step 342 the STB tunes to the frequency corresponding to the selected SD program channel. Operation proceeds from step 342 back to step 304 via connecting node A 329.

If in step 338 it is determined that in response to the presented prompt, the user has selected the corresponding HD program channel, then operation proceeds from step 338 to step 340. In step 340, a prompt is presented, e.g., on a display screen of the TV, giving the user opportunity to select an HD auto tune option to be used automatically. For example, the presented prompt may be, "Do you wish to enable automatic high definition auto tuning?"

Operation proceeds from step 340 to step 344 where it is determined whether the user has selected, e.g., by transmitting a response from the remote control which is received by the STB, the HD auto tune option in response to the presented prompt. If it is determined that the user has selected the HD auto tune option, operation proceeds from step 344 to steps 346. In step 346, the STB 200 stores information indicating that HD auto tune option has been enabled in the memory 216. In some embodiments storing this information includes updating the user configuration information 242 to indicate that HD auto tune is enabled. Operation then proceeds to step 348.

If in step 344 it was determined that the user did not select the HD auto tune option in response to the presented prompt, operation proceeds from step 344 directly to step 348.

Whether or not the user selects to set the HD auto tune option to be used automatically in the future, at least in this particular case where operation proceeds to step 348, the user has selected the corresponding HD channel via the response to the prompts and has made it clear that the user prefers at least for this one selection to see the corresponding HD channel instead of the originally selected SD channel. Note that the method of the invention allows the user to select the corresponding HD channel without having to know the number of the corresponding HD channel or even its existence at the time the SD channel is selected by the user. In step 348 the STB tunes to the frequency of the corresponding the HD program channel instead of the frequency corresponding to the user selected SD program channel. Thus in such a case the tuning to the corresponding HD program channel is performed in response to the user selecting the corresponding high definition program channel, e.g., through the user's response to one or more prompts. Thus, in some embodiments, e.g., when the HD auto tune is not enabled to automatically tune to a corresponding HD channel, said tuning to the HD program channel instead of the SD program channel selected by the user occurs after the user selects the corresponding HD program channel. Operation proceeds from step 348 back to step 304 via connecting node A 329.

Referring once again to FIG. 3A and step 304 included therein, if when monitoring for user input the STB detects an input used to control program recording, operation proceeds via step 313 to the program recording schedule control routine 380 shown in FIG. 3C.

Program recording schedule control sub-routine 380 begins in sub-routine start step 313 and proceeds to steps 351 and 352 which may be performed asynchronously or in parallel. In step 351 a recording timer is set, e.g., the channel and time which are to be used to initiate a program recording is stored in a memory as part of a recording schedule. For example, from the information recovered from the recording scheduling input signal from the user, an entry for each item to be recorded may be created in the recording information 244. The recording information 244 includes an entry for each program to be recorded.

In step 352 the STB 200 maintains a current time clock, e.g., a clock which provides time information used to determine if a recording operation is to be performed. With the clock operating with accurate timing information, e.g., based on an external signal supplied from the cable network or another source, operation proceeds from step 352 to step 354. In step 354, which is performed on an ongoing basis, the STB checks the current time clock to determine if the current time matches a time corresponding to a recording event, e.g., a start time of a program to be recorded as indicated in recording information 244. If the current time does not match a recording start time operation no action is taken until the next possible recording time as indicated by the arrow returning from the "N" output of step 354 back to the input of step 354 which is performed on a periodic basis. However, if the current time matches the start time of a scheduled recording event operation proceeds from step 354 to step 358.

In step 358 the STB 200 determines if a program channel to be recorded is an HD channel or an SD channel. In some embodiments the STB 200 can determine this by consulting the recording information 244 to look up the channel number on which the program to be recorded is broadcast and using knowledge of which channel numbers are used for HD and SD channels. HD and SD channel information can be obtained by consulting the program channel information 246 to check the whether the channel number corresponds to an HD channel or SD channel. If the channel to be recorded is an HD channel, operation proceeds from step 358 to step 360 where the STB 200 records the HD channel for the set time, e.g., the duration of the program to be recorded. If the channel to be recorded is an SD channel, the operation proceeds from step 358 to step 362 where a determination of whether or not the HD auto tune feature is enabled. This determination, in some embodiments is made on a per program type basis, e.g., with a user enabling or disabling HD auto tuning for some types of programs but not others. Thus, in some embodiments the STB 200 determines whether or not the HD auto tune option is enabled for a program type corresponding to the program to be recorded. In such embodiments, a user can configure the STB 200 such that HD auto tune option is enabled for one or more program types while not for other program types. For example, the user can enable HD auto tune for, e.g., recording of movies, sports while disabling it, e.g., for news, cartoon shows etc. In other embodiments where HD auto tune is not implemented on a per program type basis but rather simply enabled/disabled for all types of programs, a simple determination is made based on an HD auto tune setting which is independent of what type of program or programs are to be recorded or viewed.

If it is determined that the HD auto tune option is enabled, (optionally taking into consideration the program type to be recorded), operation proceeds from step 362 to step 364. Otherwise, when the HD auto tune is determined to be disabled for purposes of the recording event being handled, operation proceeds from step 362 to step 366.

In step 364 the STB 200 determines whether or not an HD program channel is available corresponding to the SD program channel which is to be recorded for the duration of the program to be recorded. This may be done in the manner previously discussed based on the channel number. If it is determined that a corresponding HD program channel is not available, operation proceeds from step 364 to step 366. In step 366 the STB 200 records the SD channel for the duration of the program to be recorded. Operation proceeds from step 366 to step 370 where the STB 200 box stops the recording operation for the current recording event. In step 364 if it is determined that a corresponding HD program channel is available, the operation proceeds from step 364 to step 368 where the STB 200 records the HD channel for period of time corresponding to the program to be recorded. Operation proceeds from step 368 to step 370 where the STB 200 box stops the recording operation for the current recording event.

Figure 4:
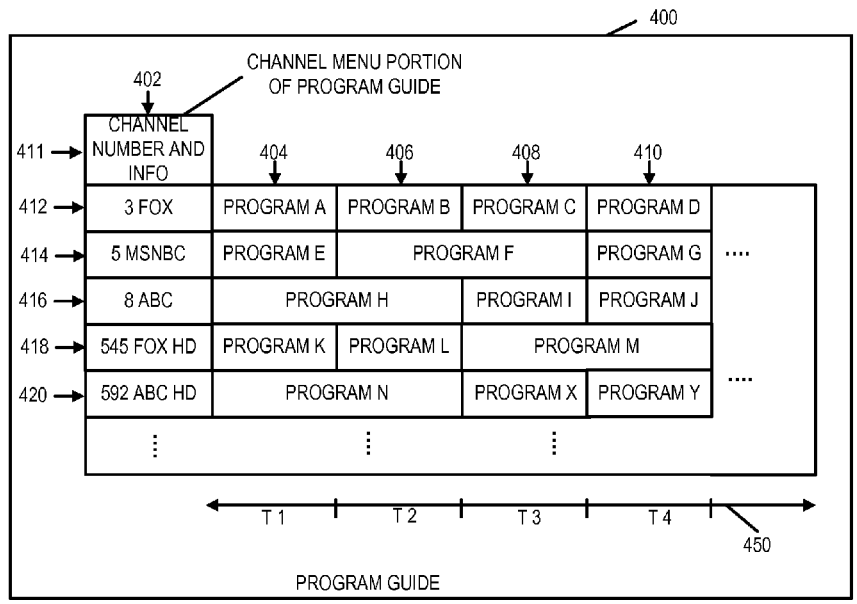
FIG. 4 illustrates an exemplary program guide including a complete channel listing, which may be displayed in accordance with the invention.

FIG. 4 illustrates an exemplary program guide 400 in a grid format which may be normally displayed to the user when the HD auto tune option is disabled, in accordance with the invention. The program guide 400 includes a plurality of rows and columns showing information regarding program channels. Column 402 is the channel menu portion of the program guide 400 showing a complete channel line up that is displayed to the user including both SD channels and HD channels. In some embodiments, a channel number and information such as channel/network name is displayed in each entry in column 402.

In the program guide 400, each row corresponds to a different program channel and shows a plurality of entries, each representing a program which is broadcast on the corresponding channel. Arrow 450 shows the time axis which may be displayed at the bottom or top. In some embodiments the time axis 450 shows the time duration of programs and/or start time, end time etc., of different programs displayed in the program guide 400. In some embodiments different slots shown in time axis 450, e.g., T 1, T 2, T 3, T 4 etc., represent timeslots during which a program or a portion of program is broadcast.

In the exemplary program guide shown in FIG. 4, Row 412 corresponds to channel 3, e.g., Fox channel and includes one or more programs broadcast on the channel 3 during a time slot as shown by the timing axis 450. Row 414 corresponds to channel 5, e.g., MSNBC channel, row 416 corresponds to channel 8, e.g., ABC channel, row 418 corresponds to channel 545 which is, e.g., HD version of Fox channel, while row 420 corresponds to channel 592 which is, e.g., HD version of ABC channel. Columns 404, 406, 408 and 410 include entries for programs, e.g., program names/titles which are broadcast on different channels at time indicated by the time axis 450. For example, as shown in column 404, Program A is broadcast on channel 3, e.g., during timeslot T1, Program E is broadcast on channel 5, e.g., during timeslot T1, Program H is broadcast on channel 8, e.g., during timeslots T1 and T2, Program K is broadcast on HD channel 545, e.g., during timeslot T1, and Program X is broadcast on channel 592, e.g., during timeslots T1 and T2. Timeslots may be half hour time slots or of any other time duration.

FIG. 5 illustrates an exemplary program guide 500 in a grid format which may be displayed to the user when the HD auto tune option is enabled, in accordance with the invention. As discussed previously, in accordance with one aspect of the invention, by enabling the HD auto tune option the user can configure the STB 200 to automatically tune to HD version of a selected SD program channel if the corresponding HD version of the selected SD program channel is available for simultaneous broadcast. In accordance with the invention, when the HD auto tune option is enabled, the STB 200 displays a simplified program guide such as the one shown in FIG. 5, with a single entry for each program channel for which both an SD and a corresponding HD program channel is available.

The first column 502 in the program guide 500 is the channel menu portion of the program guide 500, showing a channel line up that is displayed to the user. The channel menu portion 502 includes a single entry for each program channel for which both an SD and a corresponding HD program channel is available along with an HD auto tune ON indicator. For example, channel 3, e.g., fox channel is displayed along with an HD auto tune indicator "HDA" identifying that HD auto tune option is enabled. Similarly other SD channels such as channel 8, channel 9 etc. in this example, for which a corresponding HD channel is available, are displayed along with the auto tune indicator (HDA) as shown in column 502. The SD program channels for which a corresponding HD channel is not available for simultaneous broadcast, such as channel 5 and channel 15 in this example, are simply displayed without any auto tune indicator. When a user selects, e.g., channel 3 from the displayed program guide 500, the STB 200 will automatically tune to a channel frequency on which the HD version of channel 3 is being broadcast. On the other hand when a user selects an SD channel, e.g., channel 5, for which a corresponding HD channel is not available, the STB 200 tunes to the selected SD channel 5.

In the program guide 500, each row corresponds to a different program channel and shows a plurality of entries, each representing a program which is broadcast on the corresponding channel. Arrow 550 shows the time axis which may be displayed at the bottom or top. In some embodiments the time axis 550 shows the actual time duration and/or start time, end time etc. of different programs displayed in the program guide 500. In some embodiments different slots shown in time axis 550, e.g., T 1, T 2, T 3, T 4 etc., represent time slots during which a program or a portion of program is broadcast.

In the exemplary program guide shown in FIG. 5, Row 512 corresponds to channel 3, e.g., Fox channel and includes one or more programs broadcast on the channel 3 during a time slot as shown by the timing axis 550. Row 514 corresponds to channel 5, e.g., MSNBC channel, row 516 corresponds to channel 8, e.g., ABC channel, row 518 corresponds to channel 9, e.g., channel ATV, while row 520 corresponds to channel 15, e.g., channel TVX. Columns 504, 506, 508 and 510 includes entries for programs, e.g., program names/titles which are broadcast on different channels at a time indicated by the time axis 550. For example, as shown in column 504, Program A is broadcast on channel 3, e.g., during timeslot T1, Program E is broadcast on channel 5, e.g., during timeslot T1, Program H is broadcast on channel 8, e.g., during timeslot T1 and continues during timeslot T2, Program K is broadcast on channel 9, e.g., during timeslot T1, and Program N is broadcast on channel 15, e.g., during timeslot T1 and continues in timeslot T2.

Figures 6, 7:
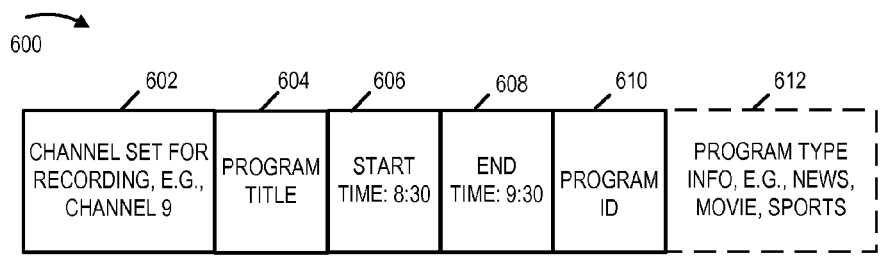
FIG. 6 illustrates an exemplary set of recording information.
FIG. 7 illustrates an exemplary set of program channel information presented in the form of a table, in accordance with the invention.

FIG. 6 illustrates an exemplary table 600 showing a set of recording information, each of the entries in the set of recording information 600 is created for a recording event, e.g., when a user schedules a program recording. The set of recording information 600 is populated based on the program guide information 239 and program channel information 246. The STB 200 uses the set of recording information 600 when performing the recording operation in accordance with the method of the present invention. The first field 602 in the set of information 600 corresponds to an entry for the channel/channel network which is selected by the user for recording or on which a selected program is to be recorded. For example the user may simply select a program broadcast on channel 3 for recording, from the program guide 400 or 500. Based on the user selection, field 602 may be populated with corresponding channel information such as the channel number and/or channel network name.

The second field 604 shown in the set of recording information 600 corresponds to an entry for the program title, e.g., name/title of the program to be recorded. The third and fourth fields 606, 608 correspond to start and end times for the recording event. For example if a program X to be recorded starts at 9:00 PM and ends at 9:30 PM then fields 606, 608 will indicate these start and end times. The fifth field 610 in the set of recording information 600 corresponds to the program ID for the selected program to be recorded. The program ID in some embodiments includes one or more bits identifying a program. The program ID information may, and normally is broadcast along with other content from the server 138 and may be stored in the program channel information 246. The sixth field 612 is an optional field which may be present in some embodiments. Field 612 includes information regarding the type of program which is scheduled for recording, e.g., a movie, a sports event, news etc. In some embodiments the STB 200 uses information in field 612 along with other information to make a decision regarding recording of a program.

Field 612 information may be used to decide whether or nor the program scheduled for recording is to be recorded in HD. This may be the case in some embodiments where the user can configure the STB 200 to make recording decisions based on the type of program and the user sets up preferred program types which should be recorded in HD. It should be appreciated that since high definition programs normally occupy much larger memory space for storage, the user may not wish to record every program in HD. Thus, sometimes the user may configure the STB 200 to record some programs such as, e.g., movies, sports and music videos, in high definition while other programs such as news in standard definition. In such an event, the STB 200 can use the information field 612 to determine the program type and make recording decisions.

FIG. 7 illustrates an exemplary program channel information table 700, in accordance with the invention. The exemplary table 700 includes information at least some of which may be broadcast from the server 138. The program channel information table 700 may, and sometimes is stored in the STB 200 as program channel information 246. In the program channel information table 700, each row corresponds to a different channel. Row 712 corresponds to channel number 3, Row 714 corresponds to channel number 5, row 716 corresponds to channel number 8, row 718 corresponds to channel number 545 while row 720 corresponds to channel number 592 and so on.

Columns 702 include channel numbers, each channel number entry in column 702 corresponding to a different program channel. Column 704 includes entries for broadcaster IDs, each entry in column 704 corresponding to a broadcaster of a channel shown in the corresponding row. For example, the first entry in column 704 corresponds to channel number 3 in row 712. Column 706 includes channel name/network information, each entry identifying a network/channel name corresponding to a channel number shown in the corresponding row. For example, in the table shown in FIG. 7 example, row 712 corresponds to channel 3 which may be, e.g., Fox network, Row 714 corresponds to channel 5 which may be, e.g., MSNBC network.

Column 708 includes information about channel type with each entry indicating whether the channel number in the corresponding row is an HD or an SD program channel. For example first entry in column 710 indicates that channel number 3 in row 712 is an SD program channel while the fourth entry indicates that channel number 545 in row 718 is an HD program channel. Column 710 includes information, e.g., broadcaster IDs, associated with HD version of a program channels corresponding to the program channels in the corresponding rows, when a corresponding HD program channel is available. The information in each entry of column 710 includes channel broadcaster identifier bits, identifying the broadcaster of the HD program channel corresponding to the channel shown in a corresponding row. If there is no HD program channel available corresponding to a given SD program channel, the corresponding entry in column 710 will simply indicate that a broadcaster ID for the HD program channel is Not Available (NA). It should be appreciated that in some embodiments the broadcaster ID associated with a program channel is helpful for the STB 200 in determining a corresponding Quadrature amplitude modulated (QAM) carrier frequency over which a program channel is being broadcast. In some embodiments the QAM frequency mapping information is sometimes available in a separate look-up table in the STB 200.

In addition to channel information shown in table 700, guide information communicating the name of programs which are broadcast on a channel at a particular time may also be communicated to the STB. The guide information may be sent with the channel information 700 or as a separate set of information.

FIG. 8 is an exemplary look-up table 800 including a set of information. In some embodiments at least some information included in the exemplary table 800 is initially communicated from the headend to one or more STBs being served by the headend, and then may be stored by the STBs. The information included in the exemplary table 800 may, and sometimes is, used by the STB 200 in making various decisions in accordance with the invention. In the table 800, each row corresponds to a broadcaster ID. The broadcaster ID in some embodiments is a 16 bit identifier, however for simplicity and discussion purposes the broadcaster IDs listed in column 802 are shown as, e.g., XXX, XYX etc. Row 812 corresponds to broadcaster ID XXX, which is the first entry in column 802. Row 814 corresponds to broadcaster ID XYX, which is the second entry in column 802, row 816 corresponds to broadcaster ID XYZ and so on.

Column 804 includes entries corresponding to different channel numbers, each entry identifying a channel number corresponding to a broadcaster ID identified in the corresponding row. For example, the first entry in column 802 is channel 3 which corresponds to broadcaster ID XXX. The broadcaster ID is e.g., an identifier of the broadcaster or the source of the content displayed on a program channel. For example, broadcaster ID XXX in row 812 identifies the broadcaster or source of the content on channel number 3. Column 806 includes entries corresponding to different channel/network names corresponding to the channel numbers and broadcaster IDs identified in the corresponding row. Column 808 includes entries corresponding to a carrier frequency, e.g., on which a Quadrature amplitude modulated (QAM) signal is modulated, each entry in column 808 identifying the frequency over which program content corresponding to a program channel is broadcast by a broadcaster identified in the corresponding row by the broadcaster ID. Normally each program channel is allocated a frequency bandwidth over which different programs can be broadcast at different times. The frequency information may be normally communicated from the network headend 102 and is stored in the STB 200. A receiver or any other module in STB 200 receiving the modulated signals from the server 138 uses the frequency information in demodulating the received signals to recover broadcast content.

Figure 9:
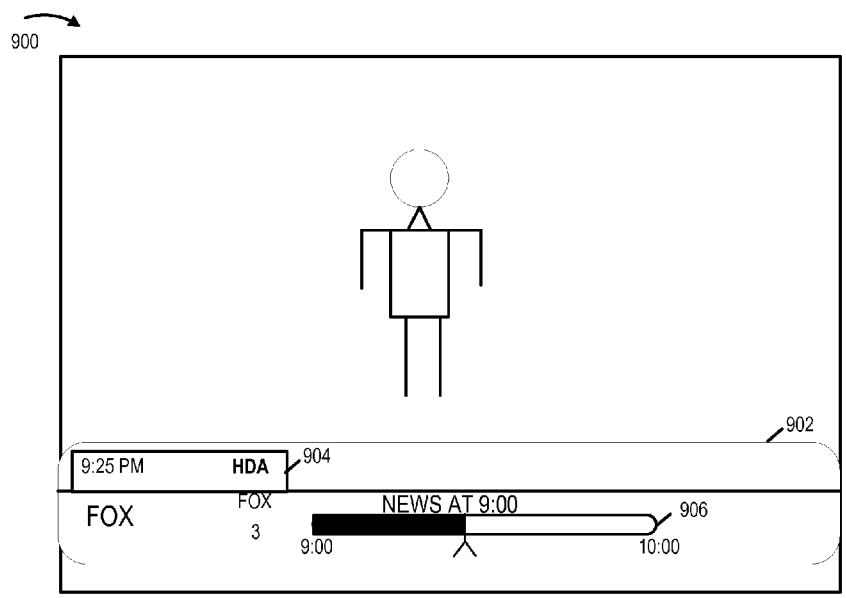
FIGS. 9 and 10 illustrate exemplary screen shots of different exemplary program channels, in accordance with the invention.
Figure 11:
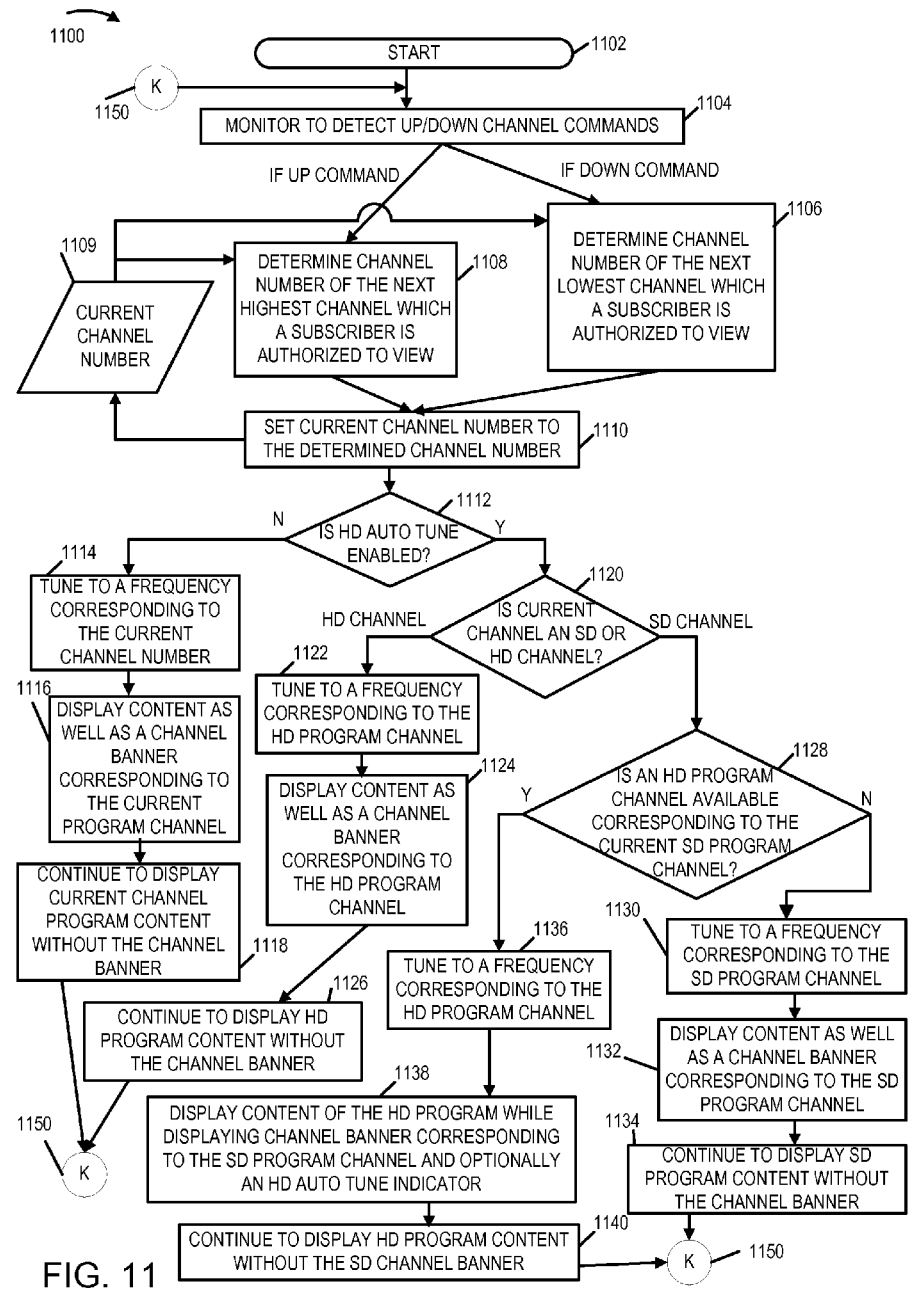
FIG. 11 is a flowchart illustrating the steps of an exemplary method performed in accordance with the invention.

FIG. 11 is a flowchart 1100 illustrating the steps of an exemplary method, in accordance with the invention used for changing channels in response to channel up or down commands, e.g., received from a remote control. In accordance with the present invention, the channel which is considered the current channel at a point in time is the channel selected by the user. However, as discussed above, if HD auto-tune is enabled, when a user selects an SD channel, the content of a corresponding HD channel may be automatically displayed. Consider briefly the exemplary screen display 900 shown in FIG. 9. Screen 900 shows an HD image corresponding to the HD channel corresponding to FOX channel 3. Thus, the image content shown in FIG. 9 is really the image content corresponding to an HD channel 300 which corresponds to the user selected SD channel 3. Note that when the user switches to or initially selects channel 3, a channel banner 902 is briefly displayed at the bottom of the image. The channel banner indicates that the channel corresponds to the FOX network, that the time is 9:25 PM and that the channel number is channel 3, the user selected channel even though the content of the corresponding HD channel is being displayed. The user is made aware that the HD channel corresponding to channel 3 is being displayed by the HDA indicator in box 904 which is the high definition auto tune indicator indicating that the HD channel being viewed was automatically tuned to, as a result of the HD auto tune function being enabled. The title of the program NEWS at 9:00 is shown above the program progress indicator 906 which indicates that the program is a little less than half over as indicated by the solid shading and runs in the 9 to 10 PM time slot.

Figure 10:
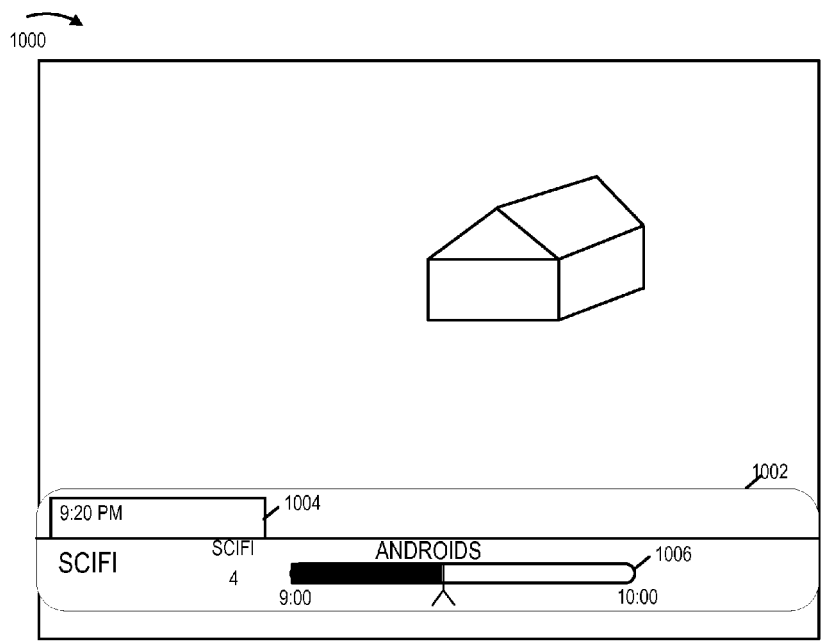

In accordance with the invention, even though the STB is tuned to and displaying the content of high definition channel 300 which has content corresponding to user selected channel 3, if the user selects a channel up or down operation, the channel will move up or down based on the user selected channel number rather than the number of the HD channel actually being viewed. Accordingly, if while viewing HD channel 300 corresponding to user selected SD channel 3 as shown in FIG. 9, the STB receives a channel up command, the STB will switch to decoding and displaying the content corresponding to channel 4, the next available channel, assuming channel 4 is an SD channel for which there is no corresponding HD channel. If a corresponding HD channel was available corresponding to SD channel 4, and the HD auto tune function remained enabled, then the corresponding HD channel corresponding to channel 4 would be displayed. FIG. 10 displays an exemplary screen 1000 in which a channel banner 1002 which indicates that channel 4 is the selected channel and the program ANDROIDS is being displayed. Information box 1004 does not include an HDA indicator which indicates, assuming HD auto tune is enabled, that there is no corresponding channel corresponding to SD channel 4 and that the program of the SD channel is being displayed.

Thus, when HD auto tune is enabled, it should be appreciated that the number of the channel being viewed may, and often does not, serve as the current channel number for purposes of determining the next channel to be displayed when an up or down channel command is received. The difference will be apparent from a review of the channel control method shown in FIG. 11.

The method of flowchart 1100 can be performed by the STB 200. The exemplary method starts in step 1102 where the STB 200 is powered on and initialized. Then in step 1104 the STB 200 monitors to detect up/down channel commands, e.g., from a user remote control device where a user is browsing different program channels. Depending on whether the STB 200 receives an up channel command, e.g., command to move to the next higher available program channel, or a down channel command, e.g., command to move to the next lower available program channel, the operation proceeds to either step 1106 or step 1108.

As can be seen in FIG. 11, information regarding the current channel number, i.e. current channel number 1109 is an input to steps 1106 and 1108. The current channel number 1109 is the channel number of the program channel which is currently being displayed and/or is currently selected by the user. The STB 200 uses current channel number 1109 to make determinations in steps 1106 and 1108. When the STB 200 receives an up channel command, operation proceeds from step 1104 to step 1108 where the channel number of the next highest channel which the subscriber is authorized to view, is determined. For example, consider a subscriber flipping through various program channels, if the subscriber is currently on channel number 3 and the STB 200 receives an up channel command, then in step 1108 channel number of the next highest channel available to the subscriber is determined, e.g., channel number 4. When the STB 200 receives a down channel command, operation proceeds from step 1104 to step 1106. In step 1106 the STB 200 determines the channel number of the next lowest channel which the subscriber is authorized to view. The operation proceeds from step 1108 or step 1106 whichever is performed according to a received command, to step 1110.

In step 1110, the STB 200 sets the current number to the determined channel number, e.g., determined in step 1106 or 1108. In some embodiments this may include updating the current channel number information stored in the STB 200 to accurately reflect the correct current channel number. Operation proceeds from step 1110 to step 1112 where the STB 200 determines whether or not the HD auto tune function is enabled. Depending on the determination in step 1112 the operation proceeds to either step 1114 or 1120. If in step 1112 it is determined that HD auto tune function is not enabled, the operation proceeds to step 1114. In step 1114 the STB 200 tunes to a frequency corresponding to the current channel number. For example, if the current channel number is, e.g., channel number 5, then in step 1114 the STB 200 tunes to a frequency corresponding to channel number 5, e.g., using the channel information 700 and/or the look-up table 800. Operation proceeds from step 1114 to step 1116 where program content corresponding to the current channel is displayed along with a channel banner corresponding to the current channel, e.g., on the user display device 204. For example, if the current channel is channel number 5, then program content which is being broadcast on channel number 5, is displayed along with channel banner corresponding to channel number 5. The channel banner is, e.g., a piece of information associated with the current channel being displayed and may include channel number information, program name, current time, and a program timer showing duration of the program being currently displayed. In some embodiments the channel banner also includes one or more function indicators, e.g., such as HD auto tune indicator, which is displayed when HD auto tune function is enabled.

Operation proceeds from step 1116 to step 1118. In step 1118 the program content continues to be displayed without the channel banner. In some embodiments a channel banner corresponding to a current channel may be displayed for a short period of time, e.g., a few seconds, after switching to the channel or the user viewing the channel pressing of an information or other key which is used to trigger the display of channel number information. Operation proceeds from step 1118 back to step 1104 via connecting node K 1150.

Returning to step 1112. If in step 1112 it is determined that HD auto tune function is enabled, the operation proceeds from step 1112 to step 1120. In step 1120 it is determined whether the current channel is an SD channel or an HD channel. If it is determined that the current channel is an HD channel, the operation proceeds from step 1120 to step 1122. In step 1122 the STB 200 tunes to a frequency corresponding to the HD program channel. The operation proceeds from step 1122 to step 1124 where HD program content as well as the channel banner corresponding to the HD program channel is displayed, e.g., on the user display device. Operation proceeds from step 1124 to step 1126 in which the HD program content continues to be displayed without the channel banner. Operation proceeds from step 1126 back to step 1104 via connecting node K 1150.

If in step 1120 it is determined that the current channel is an SD channel, the operation proceeds from step 1120 to step 1128. In step 1128 it is determined whether an HD program channel corresponding to the current SD program channel is available. If a corresponding HD program channel is not available, the operation proceeds from step 1128 to step 1130 where the STB 200 tunes to a frequency corresponding to the current SD program channel. Operation proceeds from step 1130 to step 1132 wherein SD program content as well as a channel banner corresponding to SD program channel is displayed on the user display device. The operation proceeds from step 1132 to step 1134 where the display of the channel banner is discontinued while the SD program content continues to be displayed. Operation proceeds from step 1134 back to step 1104 via connecting node 1150.

If in step 1128 it is determined that a corresponding HD program channel is available, the operation proceeds from step 1128 to step 1136. In step 1136 the STB 200 tunes to a frequency corresponding to the HD program channel instead of the current SD program channel. Operation proceeds from step 1136 to step 1138. In step 1138, HD program content corresponding to the HD program channel is displayed on the user display device along with a channel banner corresponding to SD program channel, optionally with an HD auto tune indicator. It should be noted that the channel banner displayed in accordance with step 1138 displays information corresponding to the current SD channel and not the HD channel. For example, consider that the current channel, e.g., channel number 5, is an SD channel and that a corresponding HD program channel, e.g., channel 1005 is available for the user to view. As the HD auto tune function is enabled, in accordance with the invention the STB 200 displays tunes to a frequency corresponding to channel number 1005 to display the HD program content, however the channel banner which is displayed along with the HD program content is the channel banner for current SD channel, i.e., channel number 5. In some embodiments the channel banner also includes the HD auto tune indicator, which indicates to the user that HD auto tune function is currently enabled. Operation proceeds from step 1138 to step 1140 where the HD program content continues to be displayed without the channel banner corresponding to the SD program channel. Operation proceeds from step 1140 back to step 1104 via connecting node 1150.

Accordingly, it should be appreciated that in the case of an HD channel being viewed as a result of the HD auto tune feature having tuned to an HD channel, the channel being viewed will not control the next channel to be viewed if a channel up/down command is received. Rather, the user selected channel is tracked and used to control up/down channel operations. This results in a difference between conventional systems where there is normally no difference between the channel a tuner is tuned to and the channel being viewed in which case the tuner could simply be tuned to the frequency band of the next higher or lower channel from its current setting if an up or down channel command was received assuming uniform allocation of channels to frequency bands.

In various embodiments system elements described herein are implemented using one or more modules which are used to perform the steps corresponding to one or more methods of the present invention, for example, presenting the user with available content information, receiving a user input signal indicating a channel menu display request, detecting whether or not an HD auto tune option is enabled, detecting a type of channel selected by the user, controlling the set top box to tune to a selected channel, each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of providing access to a program channel, the method comprising:
presenting a user of a customer premise device an option to enable a high definition auto tune option to be used automatically after selection by the user; and
upon detecting that the user has selected the high definition auto tune option, storing information indicating that the high definition auto tune option has been enabled.

2. The method of claim 1, further comprising:
receiving user input indicating selection of said high definition auto tune option prior to storing said information indicating that the high definition auto tune option has been enabled.

3. The method of claim 2, further comprising:
detecting selection of a standard definition program channel by a user;
determining if a high definition program channel is available corresponding to the selected standard definition program channel;
determining if the high definition auto tune option has been enabled; and
tuning to a frequency corresponding to the high definition program channel instead of a frequency corresponding to the standard definition program channel selected by the user when a high definition program channel corresponding to the selected standard definition program channel is available and the high definition auto tune option is enabled.

4. The method of claim 1, further comprising:
presenting, following detecting selection of a standard definition program channel for which a high definition program channel exists, said option to enable the high definition auto tune option if it is not already enabled.

5. The method of claim 1, further comprising:
prior to detecting selection of a standard definition program channel by the user, presenting a channel menu including standard definition channels along with an indicator that the high definition auto tune function has been enabled.

6. The method of claim 5, wherein said indicator that the high definition auto tune function has been enabled is presented with each standard definition program channel indicator which corresponds to a program channel for which a corresponding high definition program channel is available.

7. The method of claim 3, further comprising: detecting selection of a second standard definition program channel by the user; determining if a second high definition program channel is available corresponding to the selected second standard definition program channel; prompting, if the high definition auto tune option is not enabled, the user to indicate if the user would like to select the corresponding second high definition program channel rather than the selected second standard definition program channel; and upon determining that the user has not selected the second high definition program channel, tuning to the frequency corresponding to the second standard definition program channel.

8. The method of claim 3, wherein determining if a high definition program channel is available corresponding to the selected standard definition program channel includes:
consulting program channel information indicating whether or not a high definition program channel is available corresponding to the standard definition channel and the corresponding frequency band used to communicate the corresponding high definition program channel when a corresponding high definition program channel is available.

9. The method of claim 1, further comprising:
presenting the user a list of program channels, said list including a single program channel entry for each program channel for which both a standard definition and a corresponding high definition program channel are available.

10. The method of claim 1, where said customer premise device is a set top box.

11. An apparatus for providing access to a program channel, the apparatus comprising:
a user option presentation device configured to present a user of the apparatus with an option of selecting a high definition auto tune option which when enabled controls the apparatus to automatically tune to a corresponding high definition program channel rather than a standard definition program channel selected by the user; and
a configuration setting storage control device for controlling the storage of information indicating that the high definition auto tune option has been enabled upon detecting that the user has selected the high definition auto tune option.

12. The apparatus of claim 11, further comprising:
a channel selection detection module for detecting selection of a standard definition program channel by a user; and
a corresponding high definition program channel availability determination module for determining if a high definition program channel is available corresponding to the selected standard definition program channel.

13. The apparatus of claim 12, further comprising:
a tuner for tuning to a frequency corresponding to a selected standard definition program channel; and
a tuner control module for controlling said tuner module to tune to a frequency corresponding to the high definition program channel instead of a frequency corresponding to the selected standard definition program channel selected by the user when said auto tune option is enabled.

14. The apparatus of claim 13, further comprising:
an auto tune setting determination module, coupled to said tuner control module, for determining, prior to tuning to a frequency corresponding to the high definition program channel, if the high definition auto tune option has been enabled; and
wherein said tuner control module is configured to control said tuner to automatically tune to a frequency corresponding to the high definition program channel when it is determined that a high definition program channel is available corresponding to the selected standard definition program channel and said high definition auto tune option is enabled.

15. The apparatus of claim 14, further comprising:
memory for storing user configuration information indicating whether or not the high definition auto tune option has been enabled.

16. The apparatus of claim 13, further comprising:
a user selection detection module for detecting channel selection by the user.

17. The apparatus of claim 16, further comprising:
a program guide presentation control module for controlling presentation of a channel menu including standard definition channels along with an indicator that the high definition auto tune option has been enabled when the high definition auto tune option is enabled.

18. The apparatus of claim 11, wherein said indicator that the high definition auto tune option has been enabled is presented with each standard definition program channel indicator which corresponds to a program channel for which a corresponding high definition program channel is available.

19. The apparatus of claim 18, further comprising:
stored program channel information indicating whether or not a high definition program channel is available corresponding to the standard definition channel and the corresponding frequency band used to communicate the corresponding high definition program channel when the corresponding high definition program channel is available.

* * * * *